(12) United States Patent
Eide et al.

(10) Patent No.: US 12,531,397 B2
(45) Date of Patent: Jan. 20, 2026

(54) DRONE WITH ROTATABLE LOOP AND ROPE CONNECTOR AND METHOD FOR SUSPENDING A ROPE FROM AN OBJECT

(71) Applicant: Comrod AS, Tau (NO)

(72) Inventors: Jo Morten Eide, Stavanger (NO); Knut Vangen, Sandvika (NO); Stian Fjelde, Jørpeland (NO); Hans Einar Steinsland, Hjelmeland (NO)

(73) Assignee: Comrod AS, Tau (NO)

( * ) Notice: Subject to any disclaimer, the term of this patent is extended or adjusted under 35 U.S.C. 154(b) by 178 days.

(21) Appl. No.: 18/555,151

(22) PCT Filed: Mar. 14, 2022

(86) PCT No.: PCT/NO2022/050065
§ 371 (c)(1),
(2) Date: Oct. 12, 2023

(87) PCT Pub. No.: WO2022/220689
PCT Pub. Date: Oct. 20, 2022

(65) Prior Publication Data
US 2024/0204493 A1 Jun. 20, 2024

(30) Foreign Application Priority Data
Apr. 13, 2021 (NO) .................................. 20210476

(51) Int. Cl.
*B64U 10/60* (2023.01)
*B64U 10/14* (2023.01)
(Continued)

(52) U.S. Cl.
CPC .............. *H02G 1/02* (2013.01); *B64U 10/60* (2023.01); *B64U 10/14* (2023.01); *B64U 2101/67* (2023.01)

(58) Field of Classification Search
CPC .............. B64U 10/60; B64U 2201/202; B64U 2101/26; B64U 30/299; B64C 39/022; B64F 3/00
See application file for complete search history.

(56) References Cited

U.S. PATENT DOCUMENTS

| 10,329,016 B1* | 6/2019 | Jackson ............... B65H 75/425 |
| 2016/0200437 A1 | 7/2016 | Ryan et al. |

(Continued)

FOREIGN PATENT DOCUMENTS

| CN | 106099760 | 11/2016 |
| CN | 207053051 | 2/2018 |

(Continued)

OTHER PUBLICATIONS

Extended European Search Report mailed Dec. 6, 2024, in corresponding European Application No. 22788524.1.
(Continued)

*Primary Examiner* — Arfan Y. Sinaki
(74) *Attorney, Agent, or Firm* — Andrus Intellectual Property Law, LLP

(57) ABSTRACT

A drone having at least one thrust device and being provided with a loop coupled to the drone. The loop is configured for fastening a rope to the drone and is provided with a rope connector for establishing a releasable connection with the rope in operational use of the drone. The loop is configured for guiding the rope connector from a first position under the drone along a predefined path to a second position over the drone i) by rotation of the loop itself or ii) by translation of the rope connector along the loop, or iii) by a combination of said rotation and said translation, wherein the predefined path is configured for ensuring a minimum distance between the rope connector and the least one thrust device of the drone.

19 Claims, 10 Drawing Sheets

(51) Int. Cl.
  *B64U 101/67*   (2023.01)
  *H02G 1/02*    (2006.01)

(56) References Cited

U.S. PATENT DOCUMENTS

| | | |
|---|---|---|
| 2016/0332851 A1 | 11/2016 | Bialkowski et al. |
| 2017/0029105 A1 | 2/2017 | Ferren et al. |
| 2019/0047696 A1 | 2/2019 | Gwin |
| 2019/0235527 A1 | 8/2019 | O'Brien et al. |
| 2020/0225684 A1 | 7/2020 | Anderson et al. |

FOREIGN PATENT DOCUMENTS

| | | | |
|---|---|---|---|
| CN | 108128454 | 6/2018 | |
| CN | 108622386 A * | 10/2018 | ............. B64C 27/08 |
| EP | 3437978 | 2/2019 | |
| NO | 345714 | 6/2021 | |
| WO | 2019152701 A2 | 8/2019 | |

OTHER PUBLICATIONS

YouTube video "Building a rope bridge with flying machines", uploaded Sep. 18, 2015. Available online at https://www.youtube.com/watch?v=CCDluZUfETc.
International Search Report and the Written Opinion for PCT/NO2022/050065, dated May 27, 2022.
Norwegian Search Report for No. 20210476, dated Oct. 28, 2021.

\* cited by examiner

DRONE WITH ROTATABLE LOOP AND ROPE CONNECTOR AND METHOD FOR SUSPENDING A ROPE FROM AN OBJECT

CROSS-REFERENCE TO RELATED APPLICATIONS

This application is the U.S. national stage application of International Application PCT/NO2022/050065, filed Mar. 14, 2022, which international application was published on Oct. 20, 2022, as International Publication WO 2022/220689 in the English language. The International Application claims priority of Norwegian patent application No. 20210476, filed Apr. 13, 2021. The international application and Norwegian application are both incorporated herein by reference, in entirety.

FIELD OF THE INVENTION

The invention relates to a drone provided with a loop coupled to the drone, the loop being configured for fastening a rope to the drone. More specifically the invention relates to a drone that is able the drone to transfer a rope over an object.

BACKGROUND OF THE INVENTION

It is from time to time desirable to be able to transfer a rope-like element, for example a rope, over an object in the air, for example in the form of a live high-voltage line.

The applicant has a climbing robot that is used to place monitoring equipment (a power line sensor) on for example a high-voltage line (U.S. Pat. No. 345,714 B1). This climbing robot uses a pair of ropes to climb up to the line. The pair of ropes is often a single rope suspended from the high-voltage line.

A drone may be used to bring the rope to the high-voltage line. Throwing the rope over the high-voltage line, by shooting it with a rope harpoon, or lifting the rope over the object and dropping the rope on the opposite side, are already known techniques. Another known technique is to use a telescopic and electrically insulated pole, which carries a releasable reel with a rope at its end. The rope has a weight on its end. The pole is used to make the reel unroll when held over the power line, dropping the weight on the other side of the power line. Often, these methods lead to difficulties due to for example wind and vegetation that complicate the work. The wind may blow the rope into a tree, where the rope might get stuck. The rope may also become wet, dirty, or even damaged if it lands directly on the ground or onto vegetation, which may affect the climbing robots climbing efficiency on the hanging rope and increase the risk in the live work process as a wet rope may be conductive. In addition, rules and regulations for Unmanned Aircraft Systems (UAS) may prohibit dropping any material from the UAS during flights. Indeed, this is prohibited in Europe.

Hence, it is necessary to find an alternative solution for placing a rope over a high-voltage line.

SUMMARY OF THE INVENTION

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claim. The dependent claims define advantageous embodiments of the invention.

In a first aspect the invention relates to a drone having at least one thrust device. The drone is provided with a loop coupled to the drone, and the loop is configured for fastening a rope to the drone. The loop (also being referred to as attachment in the first priority application) is provided with a rope connector (also being referred to as attachment point in the first priority application) for establishing a releasable connection with the rope in operational use of the drone. The loop is configured for guiding the rope connector from a first position under the drone along a predefined path to a second position over the drone i) by rotation of the loop itself around at least one rotational coupling or ii) by translation of the rope connector along the loop, or iii) by a combination of said rotation of the loop and said translation of the rope connector, wherein under and over the drone is defined in normal operational use of the drone. The predefined path is defined relative to the drone and configured for ensuring a minimum distance between the rope connector and the at least one thrust device of the drone.

The effects of the drone in accordance with the invention are as follows.

First, the guiding of the rope connector of the rope by the loop, from the first position under the drone to the second position over the drone, enables the drone to pull the rope upwards, downwards, and horizontally in predominantly one direction. The guiding of the rope connector is a continuous movement along the predefined path, so the rope connector can take any position between the first and the second position. This is advantageous when the rope is lifted to and over an object, for example a power line, and subsequently pulled down again. As the drone moves upwards, the rope connector remains in or near the first position under the drone, and the rope is pulled upwards under the drone. The drone can then move horizontally in predominantly one direction over the object. At this point the rope connector will be at a position intermediate between the first and the second position, along the predefined path. The drone can therefore pull the rope predominantly horizontally, while passing the object. As the drone moves downwards after having passed the object, the loop guides the rope connector towards the second position over the drone. The drone can now pull the rope downwards while the rope remains over the drone.

Preferably, the loop is freely rotatable so that the drone may pull the rope in any direction. The loop is preferably symmetrical.

Secondly, the predefined path, along which the loop guides the rope connector, is configured for ensuring a minimum distance between the rope connector and the at least one thrust devices of the drone. The minimum distance prevents the rope and the rope connector to come into contact with the at least one thrust device of the drone. It is critical that the rope and the loop do not touch the at least one lifting device as this would harm the flying capabilities of the drone and potentially damage the rope, the loop and/or the at least one thrust device.

Lastly, a technical effect of the loop is that its closed shape significantly reduces the risk of the loop getting accidentally stuck on a closed object like a power line as the drone is flying over it or past it.

The drone according to the first aspect of the invention may be used to carry a rope over a power line in a controlled manner. The drone can lift the rope up to the power line, over the power line and pull the rope downwards towards the ground. The drone operator has full control of where the rope comes back to the ground. This technique avoids the problem occurring when a rope is thrown over a power line or dropped from a drone, such as the rope getting stuck in trees or landing in mud or vegetation.

In order to facilitate understanding of the invention one or more expressions are further defined hereinafter.

The word "drone" must be interpreted as any Unmanned Aerial Vehicle (UAV), which normally forms a part of a so-called UAS. The thrust device of the drone may typically be a rotor. The drone may typically have a plurality of rotors. The thrust device may also be another lifting mechanism like a turbojet engine.

The word "rope" must be interpreted as any type of rope-like elements such as rope, line, cable, chain, string or thread. The rope may consist of an insulating material or of any suitable material and structure.

The wording "to pull the rope over an object" should be considered synonym to "to haul-", "to tow-", "to transfer-", "to bring-", "to carry-the rope over an object".

In an embodiment of the drone according to the invention, a first end of the loop is coupled to a first side of the drone and a second end of the loop is coupled to a second side of the drone, the second side being opposite the first side. It is advantageous to fasten the loop to opposite sides of the drone's body for a stable configuration of the drone and the loop for pulling a rope connected to the loop.

In an embodiment of the drone according to the invention, the two ends of the loop may be coupled to the drone such that a centre point of gravity of the drone is between the two ends. The centre of gravity is preferably exactly between the two ends. This contributes to the stability of the drone in operational use, as the force vector from the rope being pulled, passes through the drone's centre of gravity and would therefore not create a torque on the drone.

In an embodiment of the drone according to the invention, at least a part of the loop has an equal distance to the centre of gravity of the drone. The rope connector has therefore an equal distance to the centre of gravity at every position along this part of the loop. The advantage of this embodiment is that when a load is connected to the rope connector, such as a rope being pulled by the drone, the rope connector and the rope connected to it may slide along this part without the direction of the force vector of the rope being pulled shifting away from the drone's centre of gravity. This minimises torque, which has a positive impact on the flight balance of the drone.

In an embodiment of the drone according to the invention, the first side is the top side of the drone, and the second side is the bottom side of the drone, the top side and bottom side being defined in normal operational use of the drone, and wherein the rope connector is slidable along the loop from the first end to the second end and back. This configuration represents a simple way of enabling the guiding of the rope connector along the predefined path. The predefined path of the rope connector is simply along the loop. The rope connector is guided from the first to the second position by sliding along the loop.

In an embodiment of the drone according to the invention, the first end and the second end of the loop are fixed to the drone. This represents a simple way of coupling the loop to the drone, as the coupling does not require any rotational couplings such as bearings. In an embodiment of the drone according to the invention, the first and the second end of the loop are rotatably coupled to the drone. The rotation of the loop, in addition to the sliding of the rope connector along the loop, gives a further degree of freedom for the rope connector. It may simplify the pulling of the rope by the drone and the navigation of the drone over objects. The further degree of freedom also enables the drone to pull the rope horizontally in all directions, in addition to upwards and downwards.

In another embodiment of the drone according to the invention, the first side is the left side of the drone, and the second side is the right side of the drone, the left side and the right side being defined in normal operational use of the drone, and wherein the first end and the second end of the loop are rotatably coupled to the drone. In this configuration, the guiding of the rope connector along the predefined path is enabled by the rotation of the loop around its rotational couplings. The advantage of coupling the ends of the loop to two opposite sidewalls is that it stabilises the drone as it pulls the rope.

In another embodiment of the drone according to the invention, the loop is rotatable around the drone about an axis of rotation, wherein the axis of rotation runs through the centre point of gravity of the drone. This is a particularly stable configuration of the drone. A load pulled by the drone would not, to a significant degree, contribute to the destabilisation of the drone. The reason is that the direction of the force from the pulling of the rope passes through the drone's centre of gravity and would therefore not create a torque on the drone. This has a positive impact on the flight balance of the drone.

In another embodiment of the drone according to the invention, the drone further comprises an arm coupled to the drone, wherein the loop is rotatably connected to the arm. The rotatable connection enables the loop to freely rotate around the drone. This represents a simple configuration of the drone as it requires only one connection point, between the arm and the drone, instead of two connection points, between the two ends of the loop and the drone. This may be an advantage if the coupling of the two ends of the loop directly to the drone is difficult to achieve. It's advantageous that the loop is connected to the arm as close as possible to the drone's centre of gravity, to reduce the torque on the drone due to the force vector of the pulling of the rope not passing through the drone's centre of gravity.

In an embodiment of the drone according to the invention, the arm is rotatably or pivotably coupled to the drone. The rotation of the arm gives an additional degree of freedom for the rope connector. It may simplify the pulling of the rope by the drone and the navigation of the drone over objects. The arm may be longer than the feet of the drone, it is therefore advantageous that the arm is pivotably coupled to the drone, so that the feet of the drone may extend further than the arm as the arm pivots. It would be especially advantageous when the drone is taking off or landing.

In an embodiment of the drone according to the invention, the rope connector is fixed to the loop such that it cannot slide. This represents an easy mechanical configuration of the drone and the loop.

In a further embodiment of the drone according to the invention, the rope connector is slidable along the loop from the first end to the second end and back. The sliding of the rope connector, in addition to the rotating loop, gives a further degree of freedom for the rope connector. It may simplify the pulling of the rope by the drone and the navigation of the drone over objects.

In an embodiment of the drone according to the invention, the rope connector comprises a sheave for the rope to run through. The rope may run freely through the sheave also when the drone is positioned in the air. This enables that the rope may be lifted and partly be manoeuvred also after it has been transported over an object. Using this embodiment, one end of the rope may be fastened on the ground while the drone lifts the rope running through the pulley.

The sheave may be connected directly to the loop so that the axis of rotation of the sheave is around the loop. The sheave may also be part of a pulley that is connected to the loop such that the axis of rotation of the sheave is not around the loop.

In an embodiment of the drone according to the invention the loop is releasably coupled to the drone. It is advantageous to release the loop from the drone for transport of the drone.

In a further embodiment, the loop is collapsible or foldable in order to save space during transport.

In accordance with a second aspect, the invention relates to a method for suspending a rope from an object, the method comprising the steps:
  providing a drone according to the first aspect of the invention;
  attaching a section of the rope to the rope connector;
  flying the drone upwards from ground level to a height above the object such that the rope connector is located above the object;
  subsequently flying the drone past the object, pulling the section of the rope over the object;
  subsequently flying the drone downwards, on the opposite side of the object from where the drone flew up, pulling the section of the rope towards ground level; and
  releasing the rope from the rope connector, such that the rope is suspended from the object.

The drone according to the first aspect of the invention and the method according to the second aspect of the invention enables a controlled transport of a rope over or about an object wherein the object is positioned in the air. The advantage of carrying a rope over an object using the method according to the second aspect of the invention is that the drone operator has full control of where the rope comes back on the other side of the object. The method can be used in any type of operations where a rope must be carried over an object.

The method may further comprise providing the loop with a sheave, and letting the rope run through the sheave.

This step enables that the rope can be lifted and partly be manoeuvred also after it has been transported over or about the object.

In an embodiment of the method according to the invention, the object is a power line.

This method is a controlled method for suspending a rope from a power line, which solves the problem of uncontrolled fall occurring when a rope is thrown over a power line or dropped from a drone, such as the rope getting stuck in vegetation.

BRIEF INTRODUCTION OF THE FIGURES

In the following is described examples of preferred embodiments illustrated in the accompanying drawings, wherein.

Figure 11:
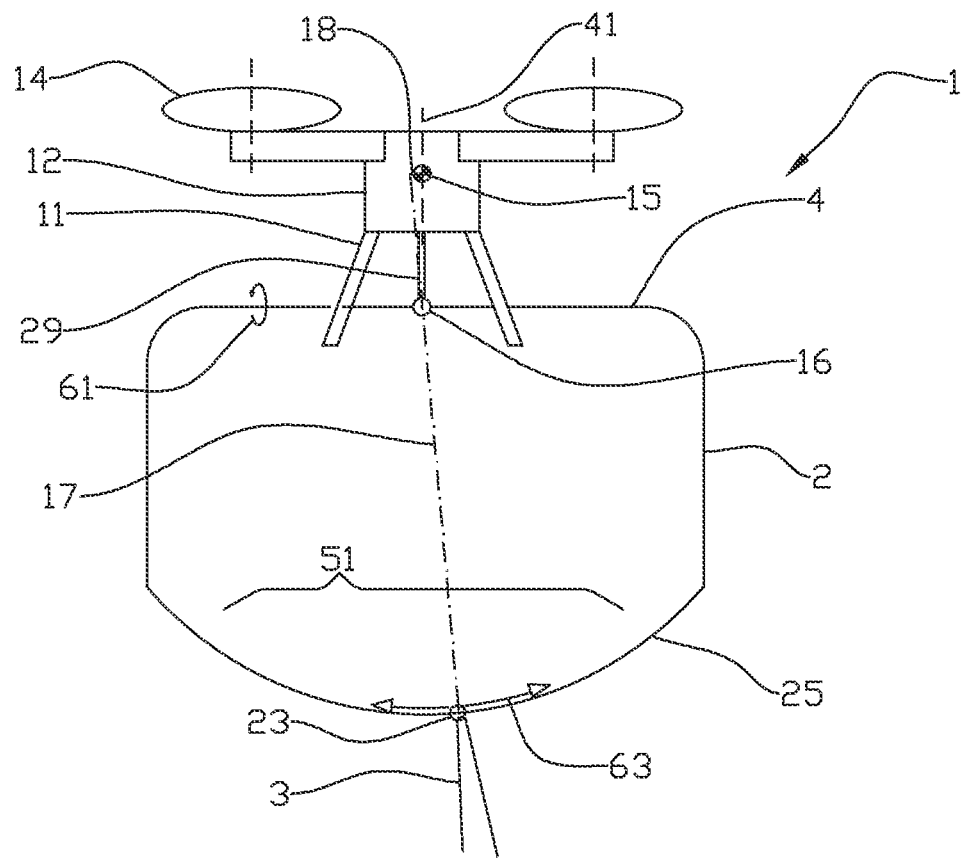
FIG. 11 shows a principle drawing of an embodiment wherein the loop is connected to an arm, which is coupled to the drone.
Figure 12:
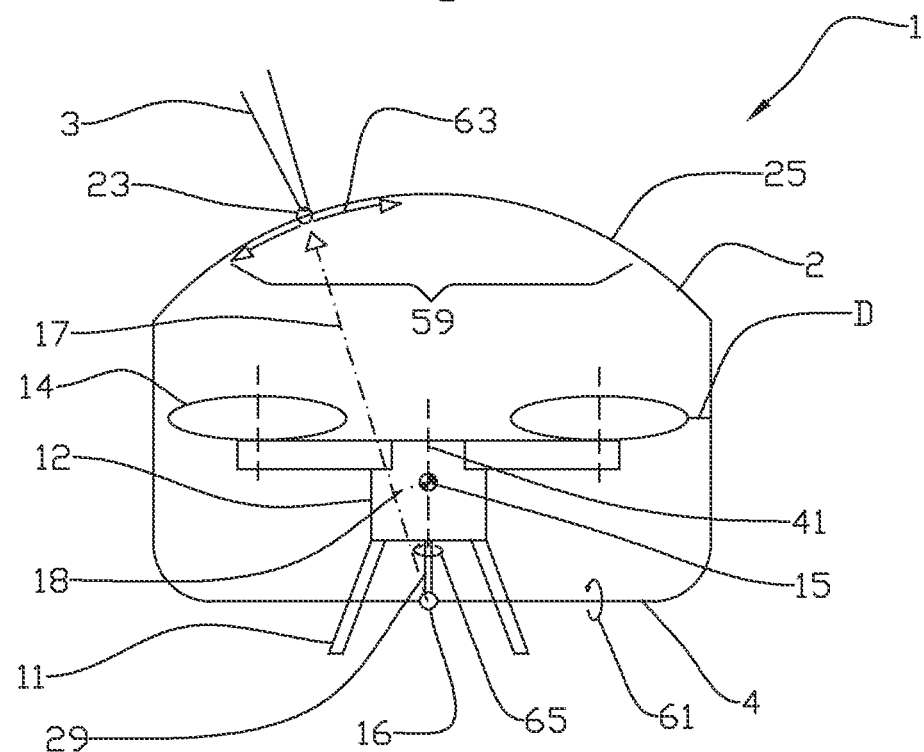
Figure 13A:
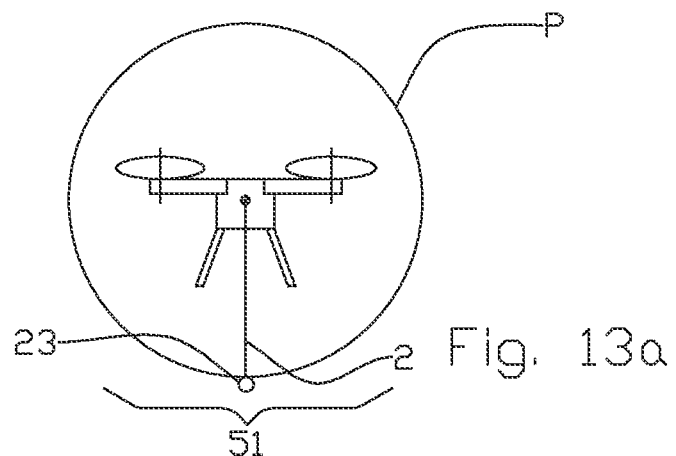
Figure 13B:
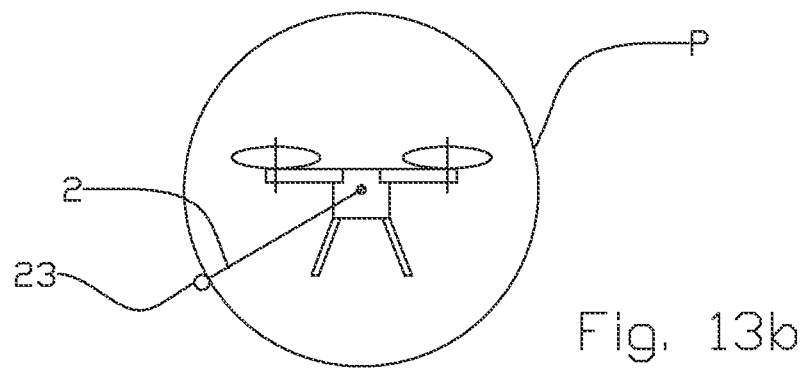
Figure 13C:
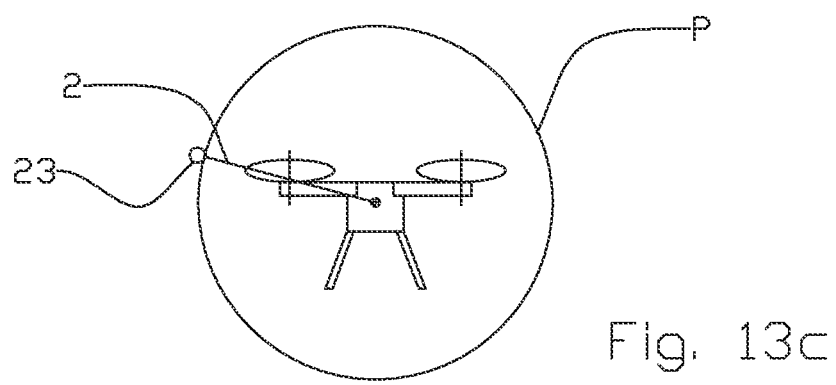
Figure 14:
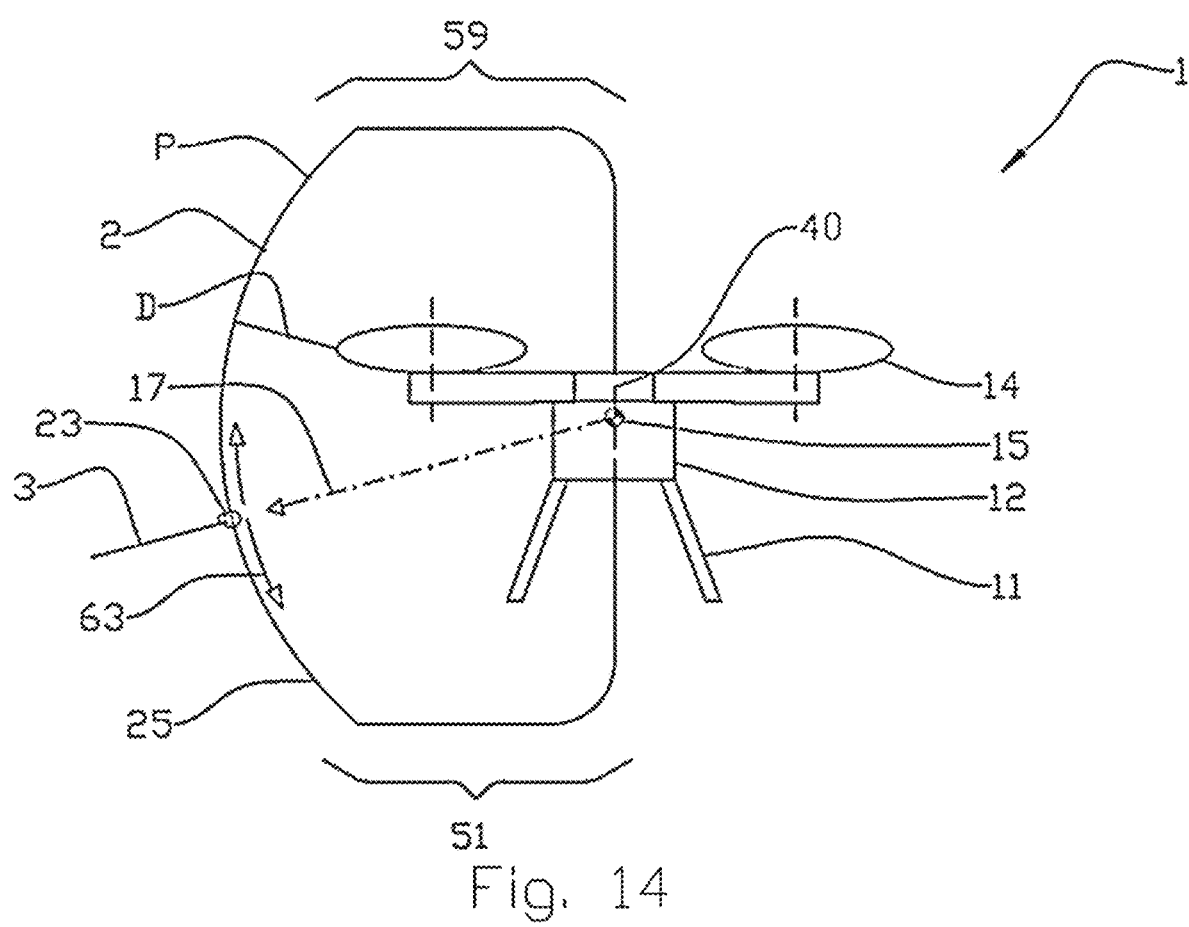
Figure 15:
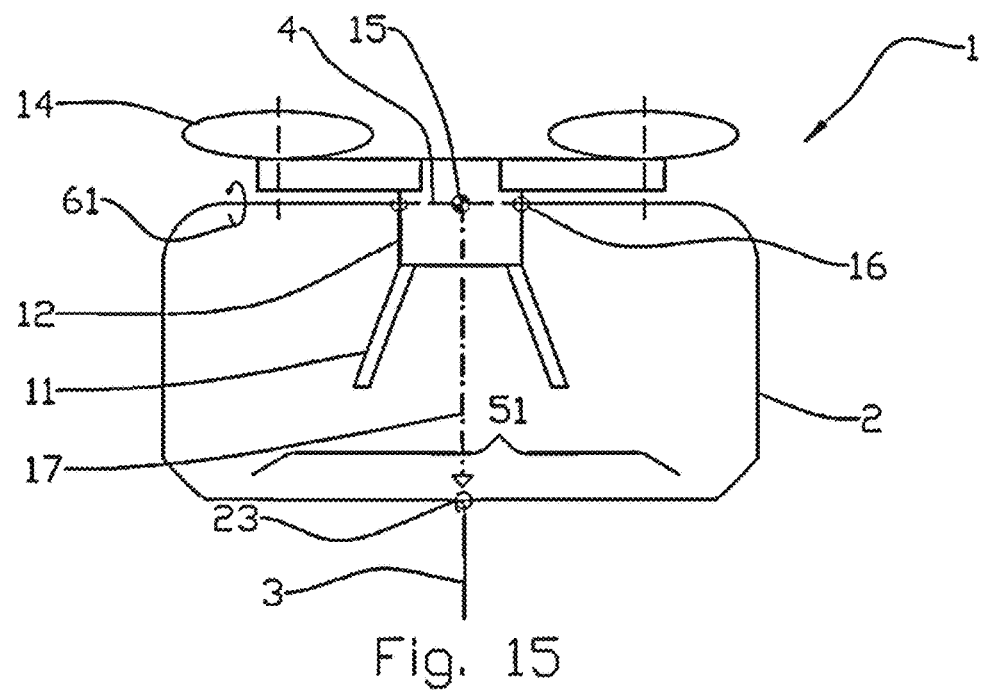

FIG. 12 shows a principle drawing of the drone in FIG. 11. The loop is rotated 180 degrees compared to what is shown in FIG. 11; and FIGS. 13a-13c show in smaller scale the drone in FIG. 1, seen from the side, wherein the loop is rotated gradually from a first to a second position FIG. 14 shows a principle drawing of an embodiment wherein the loop is fixed to the top side and the bottom side of the drone;

FIG. 15 shows a principle drawing of an embodiment wherein the rope connector is fixed to the loop.

DETAILED DESCRIPTION OF THE EMBODIMENTS

Any positional indications refer to the position shown in the figures. Through the description and the claims, position indications such as «upper» and «lower», «top» and «bottom», «under» and «over» or «horizontal» and «vertical», etc., denotes the position the drone has in the subsequent figures, which is also a natural or practical functional position of the drone.

In the figures, same or corresponding elements are indicated by same reference numbers. For clarity reasons, some elements may in some of the figures be without reference numbers.

A person skilled in the art will understand that the figures are just principal drawings. The relative proportions of individual elements may also be distorted.

In the figures the reference number 1 denotes a drone having a plurality of thrust devices 14, here shown as rotors 14. The drone 1 is provided with a loop 2 coupled to the drone 1. The loop 2 is configured for fastening a rope 3 to the drone 1. The loop 2 is provided with a rope connector 23 for establishing a releasable connection with the rope 3 in operational use. The loop 2 is configured for guiding the rope connector 23 from a first position under the drone along a predefined path P (FIGS. 13a-13d) to a second position over the drone. The guiding is done either by rotation of the loop 2 itself or by translation of the rope connector 23 along the loop 2. The guiding may also consist of a combination of the rotation of the loop 2 and the translation of the rope connector 23. The predefined path P is relative to the drone 1 and configured for ensuring a minimum distance D between the rope connector 23 and the rotors 14 of the drone 1.

The drone 1 is designed in a way known per se, with a body 12, thrust devices 14 typically in the shape of rotors 14 (also being referred to as propellers in the first priority application) with associated motors (not shown), arms 19 for the thrust devices 14, and feet 11.

The loop 2 may be made in a relatively light material as for example aluminium or fibre reinforced plastic. Insulators like plastic is advantageous to avoid disturbance of radio signals to and from the drone and is preferable when working with high voltage power lines.

Figure 1:
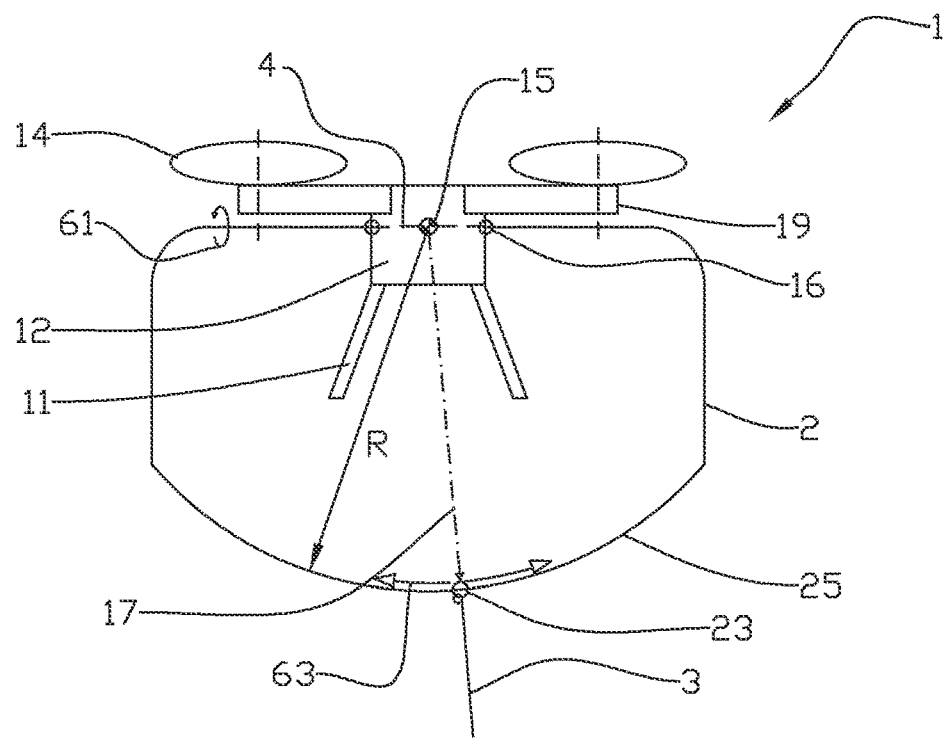
FIG. 1 shows a principle drawing of a drone that is provided with a loop according to the invention. The figure shows the drone in a front view.

In FIG. 1 the reference number 2 denotes a loop that is rotatably coupled to a drone 1. The rotation of the loop is illustrated by the arrow 61. The loop 2 has an axis of rotation 4 that passes through the drone's centre of gravity 15. If special circumstances dictate, the axis of rotation 4 may pass outside the drone's 1 centre of gravity 15. However, it is preferred that the axis of rotation is as close as possible to the drone's 1 centre of gravity 15.

Figure 2:
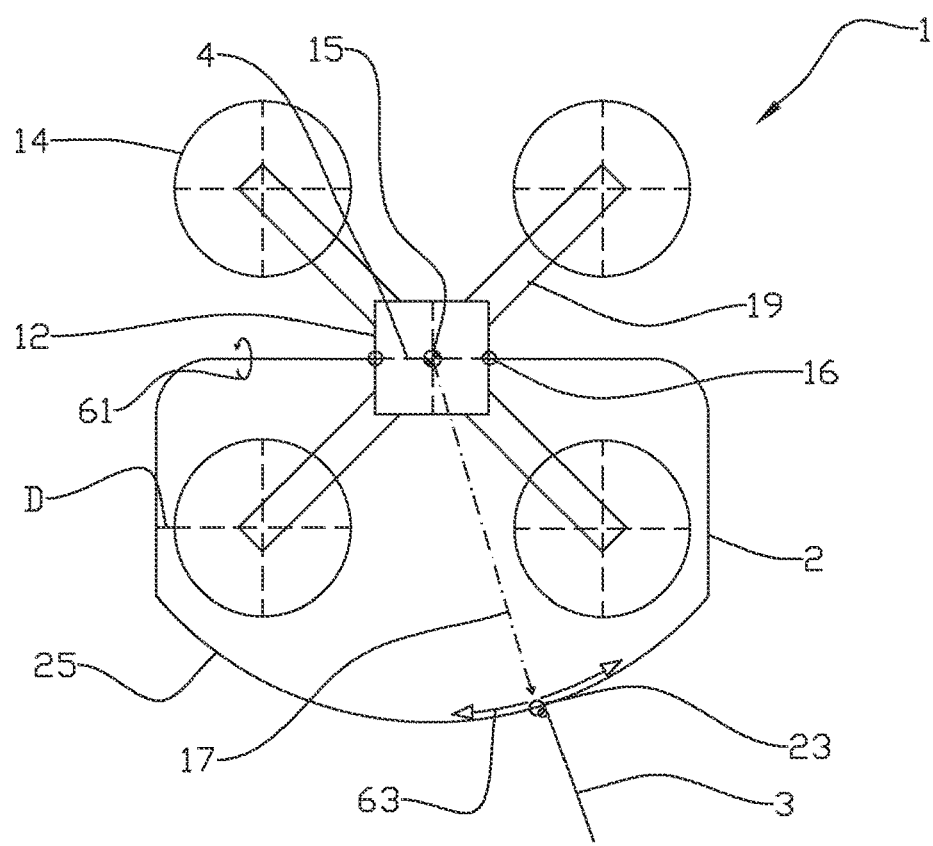
FIG. 2 shows a principle drawing of the drone in FIG. 1 seen from above. The loop is here rotated 90 degrees compared to what is shown in FIG. 1.

In FIG. 1 and FIG. 2 the loop 2 is connected to the drone 1 in rotational couplings 16 and is free to rotate about the rotational axis 4. The rotational couplings 16 denote connections typically in the form of bearings wherein the loop 2 is rotatably engaged with the drone 1.

The loop 2 is connected to the right side of the drone 1 at a first end, and to the left side of the drone 1 at a second end.

In FIG. 2 the loop 2 is rotated 90 degrees compared to its position in FIG. 1. A minimum distance D is kept between the loop 2 and the rotors 14 as the loop 2 rotates about its axis of rotation 4, so that the loop 2 can rotate freely, without touching the rotors 14.

Figure 3:
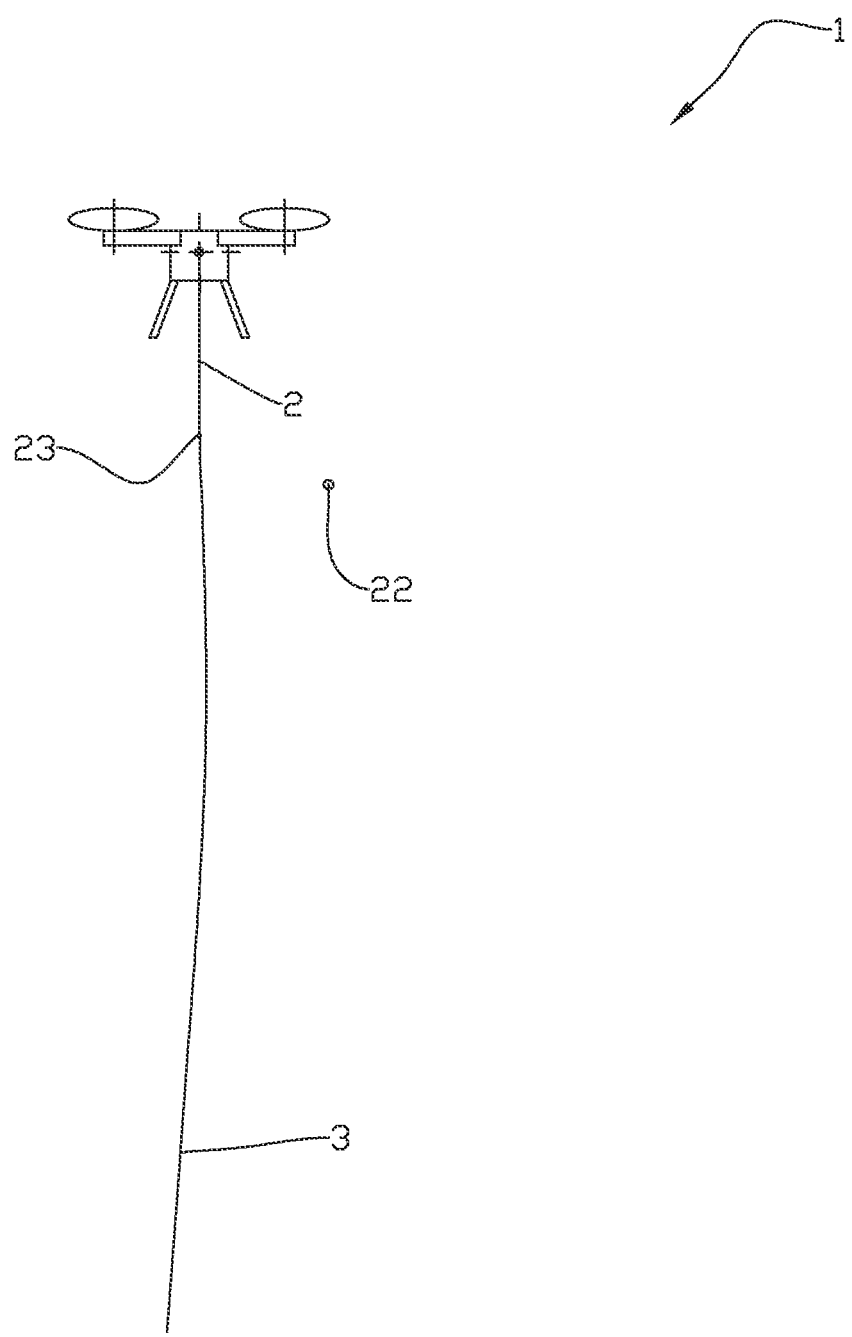
FIG. 3 shows in a smaller scale a principle drawing of a drone, seen from the side, which is in the process of lifting a rope up towards a height above an object.
Figure 4:
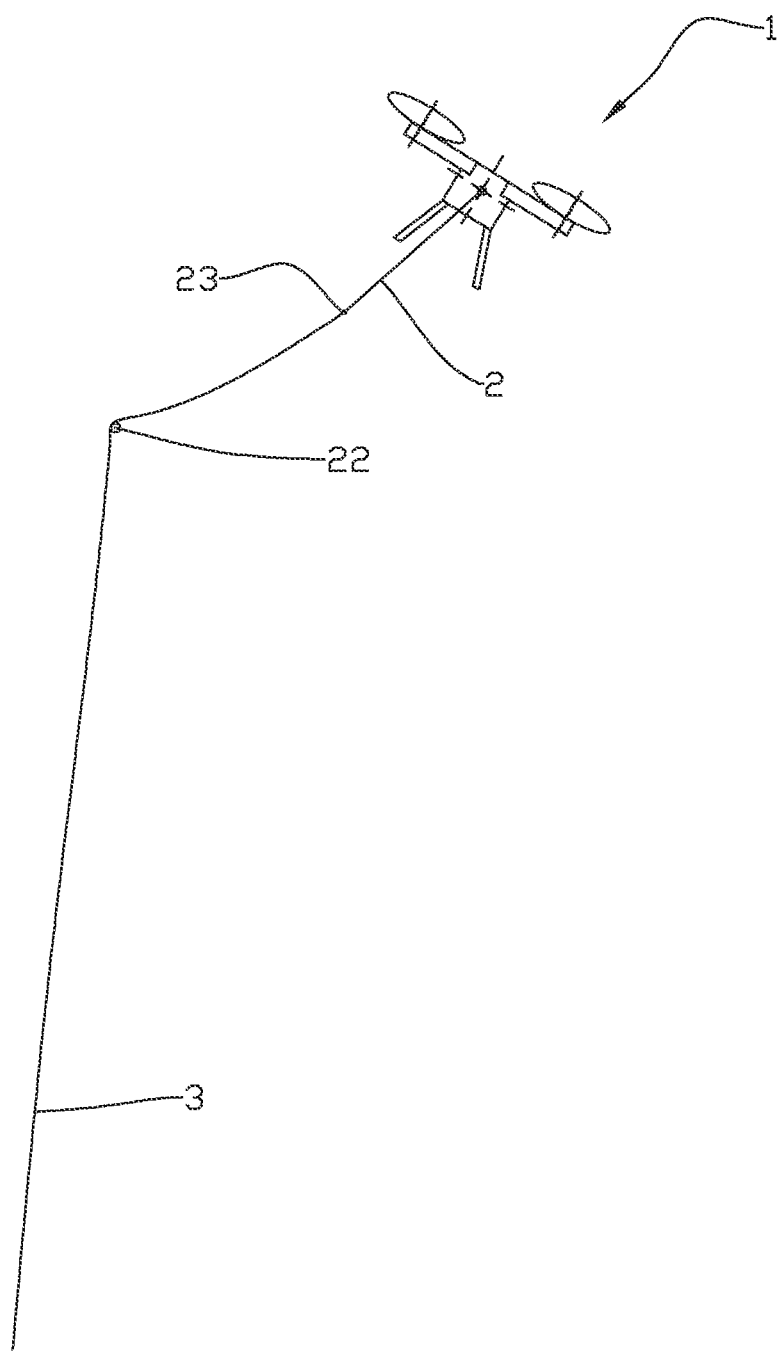
FIG. 4 shows in a smaller scale a principle drawing of the same as in FIG. 3, but the drone has here altered direction of propulsion.
Figure 5:
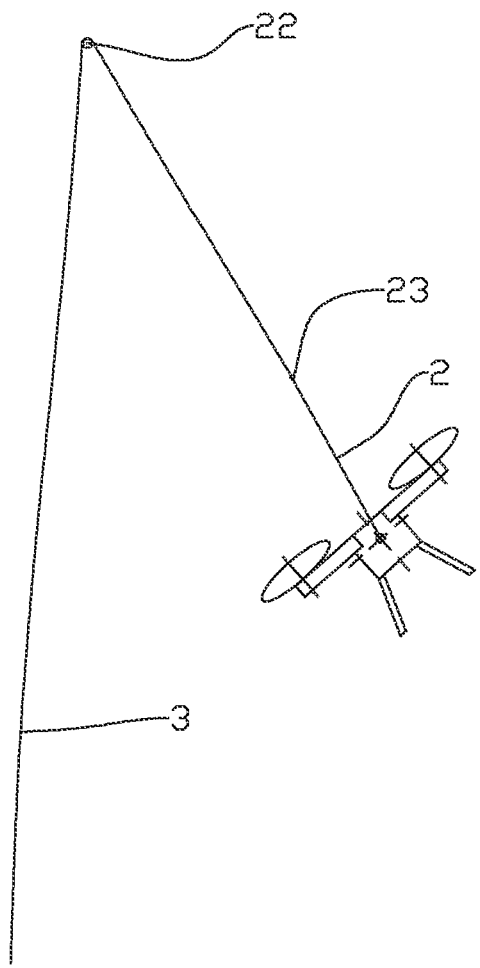
FIG. 5 shows in a smaller scale a principle drawing of the same as in FIG. 3, but the drone has here altered direction of propulsion further and is on its way down.

FIG. 3 to FIG. 5 illustrate the process where a drone 1 provided with a loop 2 transports a rope 3 over an object 22. The object 22 is in this case a power line that can be live. The drone 1 is shown from the side. FIG. 3 to FIG. 5 illustrate a non-limiting example of normal operational use of the drone 1.

When a rope 3, shall be transported about or over an object 22 which is positioned in the air, the rope 3 is fastened to the loop 2 with the rope connector 23. Then the drone 1 is steered to a height over the object 22. As the drone 1 is steered upwards, the rope connector 23 remains in or near a first position 51 under the drone 1, and the rope 3 also remains under the drone 1.

In FIG. 4 the drone 1 is shifted to the opposite side of the object 22. The loop 2 has rotated slightly about the axis of rotation 4 and has a different angle compared to the drone 1. As the drone 1 is steered over the object 22, the rope connector 23 is guided by the rotation of the loop 2 to an intermediate point along the predefined path P (FIGS. 13a-13d). The intermediate point lies between the first 51 and a second 59 position. The rope 3 now abuts the object 22.

In FIG. 5 the drone 1 has altered the direction of propulsion further and is now on its way down from the object 22. The loop 2 has rotated further about the axis of rotation 4 and is now directed at an angle upwards towards the object 22. The drone 2 is now pulling the rope 3 over the object 22. The rope connector 23 is now in the second position over the drone 1, and the rope 3 remains above the drone 1 as the drone 1 pulls the rope 3 downwards.

The process illustrated in FIG. 3 to FIG. 5 demonstrates how the rope 3 may be transported over an object 22, such as a power line. The loop 2 has rotated about the drone 1 without either the loop 2 or the rope 3 having conflicted with the drone 1 itself or the rotors 14 of the drone 1. The rotation of the loop 2 may be a passive movement, or it may be controlled by an operator of the drone 1.

Figure 6:
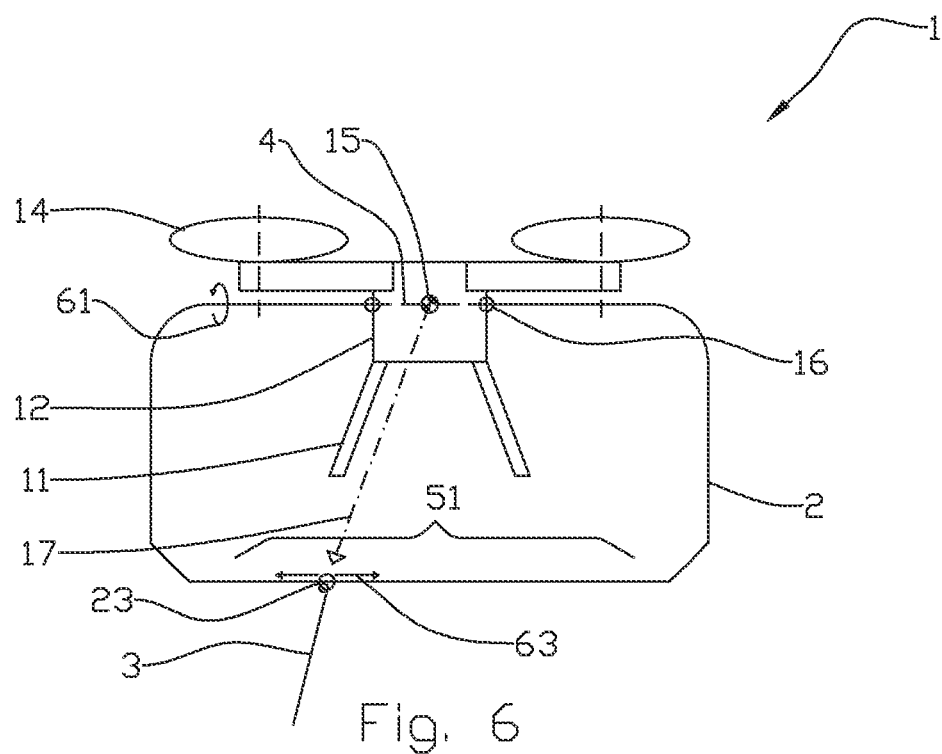
FIG. 6 shows a principle drawing of an embodiment wherein the loop is somewhat simplified.
Figure 7:
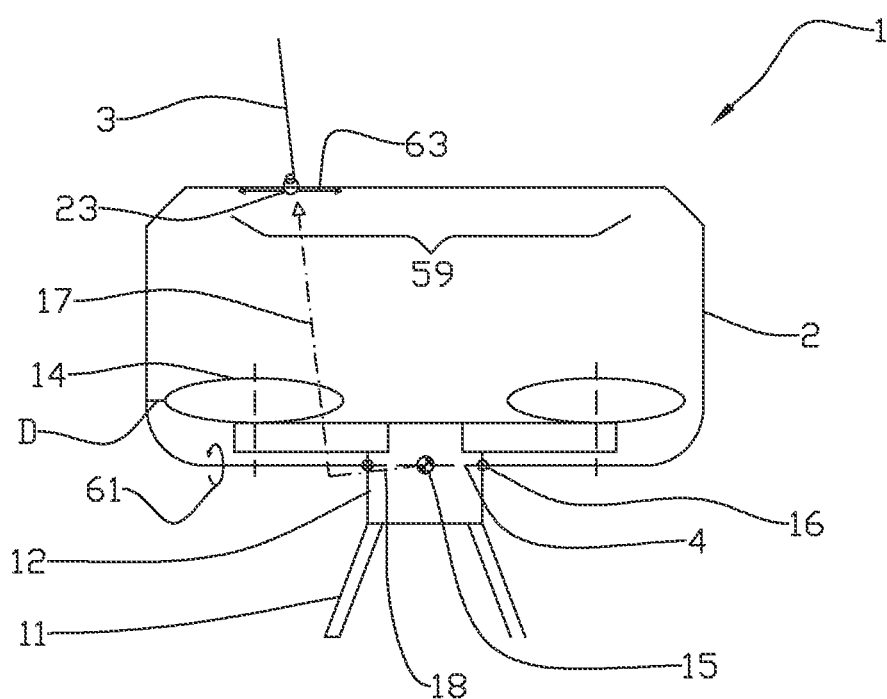
FIG. 7 shows a principle drawing of the drone in FIG. 6. The loop is rotated 180 degrees compared to what is shown in FIG. 6.

It is obvious that the loop 2 can be designed in a great number of other forms. An example is given in FIG. 6, where the loop is given a simplified form. The loop 2 is connected to the drone 1 in rotational couplings 16 and is free to rotate about the rotational axis 4, illustrated by the arrow 61. The axis of rotation 4 passes through the drone's 1 centre of gravity 15. In FIG. 6 the rope connector 23 is in a first position 51 under the drone 1. In FIG. 7, the loop 2 has been rotated 180 degrees compared to its position in FIG. 6, and the rope connector 23 is here in a second position 59 over the drone 1. A minimum distance D between the loop 2 and one of the rotors 14 is shown in FIG. 7.

Figure 8:
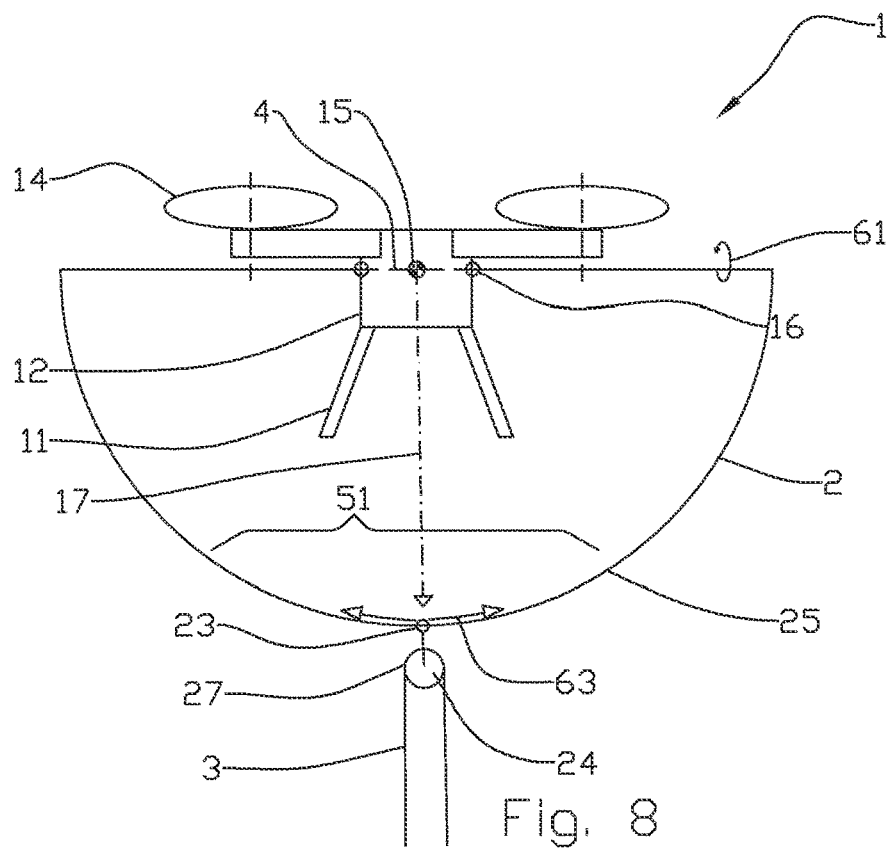
FIG. 8 shows a principle drawing of an embodiment wherein the loop is provided with a pulley.
Figure 9:
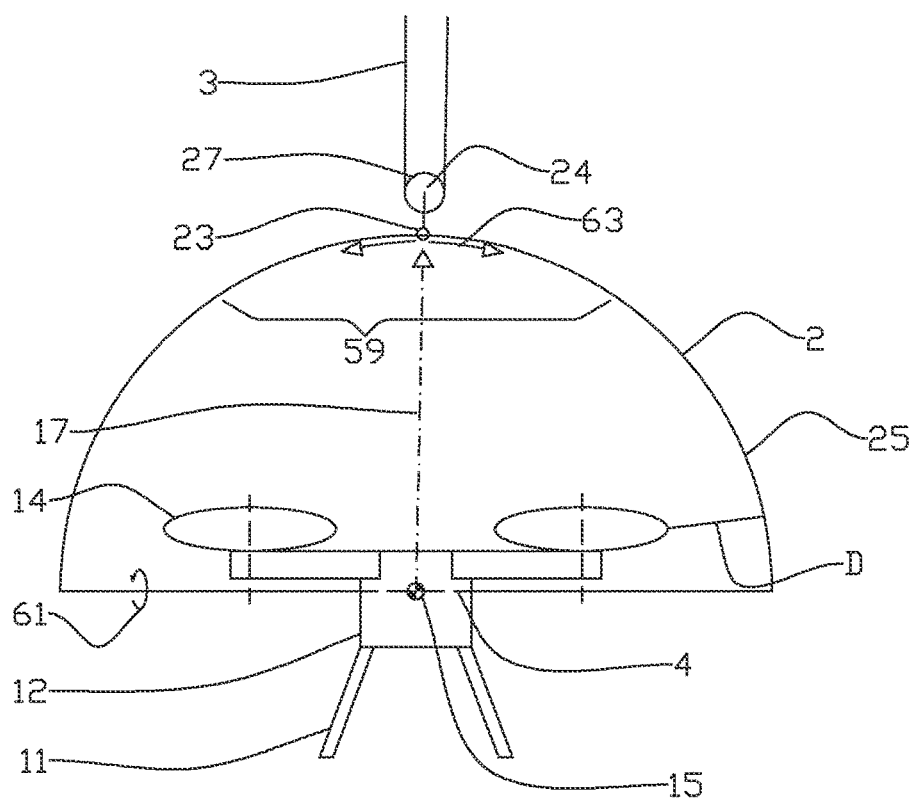
FIG. 9 shows a principle drawing of the drone in FIG. 8. The loop is rotated 180 degrees compared to what is shown in FIG. 8.

In FIG. 8 and FIG. 9 the loop 2 has a larger curved part 25 which here forms a semicircle. In FIG. 8 the rope connector 23 is in a first position 51 under the drone 1. The loop 2 is connected to the drone 1 in rotational couplings 16 and is free to rotate about the rotational axis 4, illustrated by the arrow 61. In FIG. 9, the loop 2 has rotated 180 degrees compared to its position in FIG. 8, and the rope connector 23 is here in a second position 59 over the drone 1. A minimum distance D between the loop 2 and one of the rotors 14 is shown in FIG. 9.

In FIGS. 1-2, 6, and 8-9 the force vector 17 of the rope 3 being bulled passes through the drone's 1 centre of gravity 15. In FIG. 7 is shown an example where the force vector 17 of the rope 3 being pulled does not pass through the centre of gravity 15, thus creating a torque 18 on the drone 1. Any torque on the drone must be compensated by an uneven thrust of the rotors, reducing power margins for control and stability.

In an embodiment of the drone shown in FIGS. 11 and 12, the loop 2 is connected to an arm 29, which is coupled to the drone 1. The loop 2 is rotatably connected to the arm 29 in one rotational coupling 16, so that the loop 2 may rotate about its axis of rotation 4, illustrated by the arrow 61. In FIG. 11 the rope connector 23 is in a first position 51 under the drone 1. In FIG. 12, the loop 2 has rotated 180 degrees compared to its position in FIG. 11, and the rope connector 23 is here in a second position 59 over the drone 1. A minimum distance D between the loop 2 and one of the rotors 14 is shown in FIG. 12.

Due to the arm 29, the force vector 17 of the pulling of the rope pass through the drone's 1 centre of gravity 15 only when the rope is directly underneath the drone's 1 centre of gravity 15 and if the arm 29 is coupled to the drone 1 beneath it's centre of gravity 15. Most of the time the force vector 17 from the rope 3 being pulled will not pass through the centre of gravity 15, thus creating a torque 18 on the drone 1, as shown in FIG. 11 and FIG. 12. The arm 29 is preferably as short as possible, to reduce the torque on the drone 1.

The arm 29 is rotatably coupled to the drone 1, so that the arm 29 may rotate about a second axis of rotation 41, illustrated by the arrow 65 in FIG. 12. The arm 29 may be pivotably coupled to the drone 1.

In an embodiment of the drone shown in FIG. 14, the first end and the second end of the loop 2 are fixed to the top side and bottom side of the body 12 of the drone 1, not allowing rotation of the loop 2 with respect to the body 12. The ends of the loop 2 are aligned along an axis 40 that passes through the drone's centre of gravity 15. This represents a simple way of coupling the loop 2 to the drone, as the coupling does not require any rotational couplings, such as rotational couplings 16.

Figure 13D:
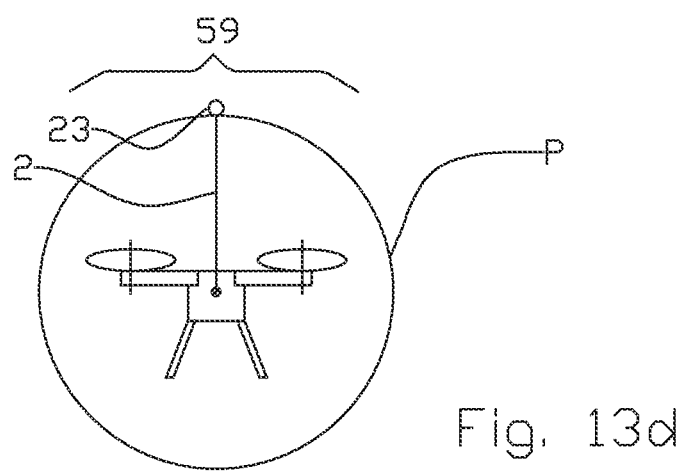

In the embodiments of the drone 1 shown in FIGS. 1 to 9 and FIGS. 11 and 12, the rope connector 23 is guided from a first position 51 under the drone 1, to a second position 59 over the drone 1 by rotation of the loop 2, illustrated by the arrows 61. The rope connector 23 is guided along a predefined path P, in a continuous manner. The predefined path P is shown in FIG. 13*a*. Here, the rope connector 23 is in a first position 51 under the drone 1. The first position 51 may be a position directly under the drone 1, or it may deviate from the position directly underneath the drone 1. In FIG. 13*b* the loop 2 is rotated so that the rope connector 23 is in an intermediate position between the first position 51 and the second position 59, along the predefined path P. In FIG. 13*b* the rope connector 23 is still positioned underneath the drone 1. In FIG. 13*c* the loop 2 is rotated further, so that the rope connector 23 is positioned further along the predefined path P. The rope connector 23 is here positioned slightly above the drone 1. In FIG. 13*d* the loop 2 is rotated by 180 degrees compared to its position in FIG. 13*a*. The rope connector 23 is here in the second position 59 above the drone. The second position 59 may be a position directly above the drone 1, or it may deviate from the position directly above the drone 1. The loop 2 may rotate 180 degrees for the rope connector 23 to be guided from the first position 51 to the second position 59. The loop 2 may rotate more or less than 180 degrees for the rope connector 23 to be guided from the first position 51 to the second position 59. The loop 2 may rotate freely around the drone 1, so the loop 2 may rotate 360 degrees.

In the embodiments of the drone 1 shown in FIGS. 1 to 9 and FIGS. 11 and 12, the rope connector 23 may be coupled to the loop 2 in such a way that the rope connector 23 may slide freely along the loop 2, as indicated by the arrows 63 in FIG. 1 and FIG. 2, and FIGS. 6 to 9 and FIGS. 11 and 12.

Figure 10:
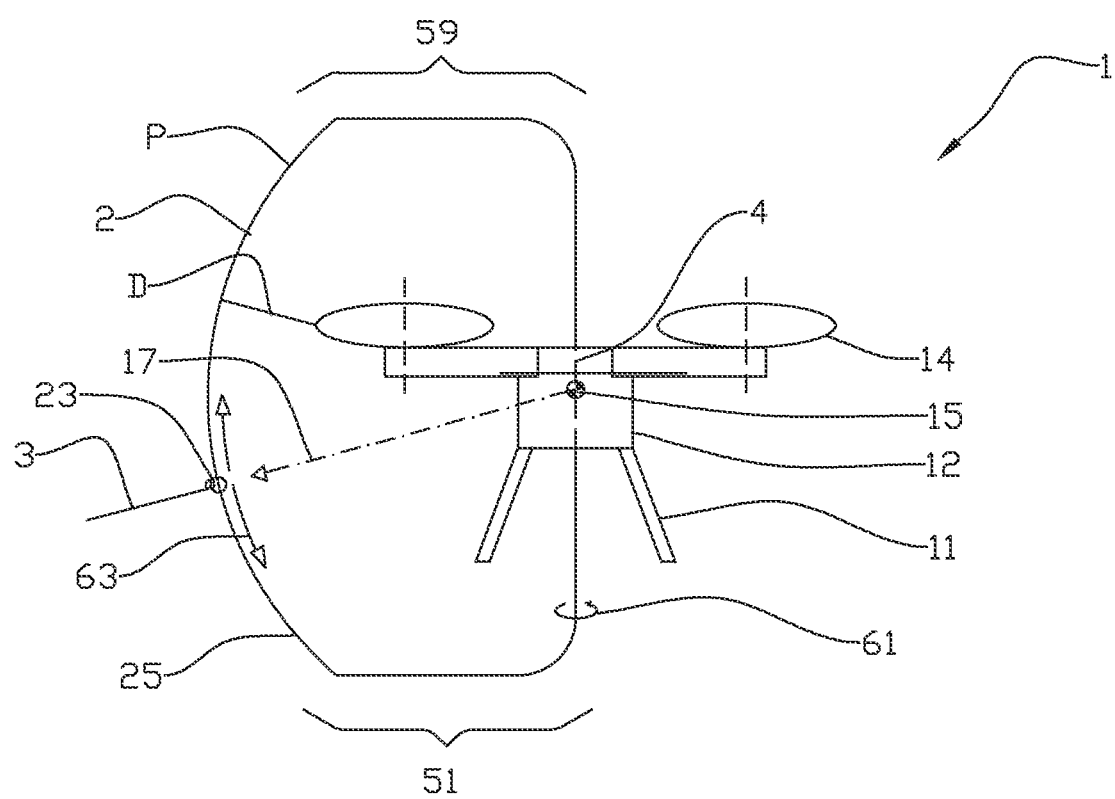
FIG. 10 shows a principle drawing of an embodiment wherein the loop is coupled to the top side and the bottom side of the drone.

In an alternative embodiment of the drone 1, shown in FIG. 10, the loop 2 is coupled to the top side of the drone 1 at a first end of the loop 2, and to the bottom side of the drone 1 at a second end of the loop 2. In this configuration, the rope connector 23 is guided from a first position 51 under the drone 1 to a second position 59 over the drone 1 by sliding along the loop 2, as indicated by the arrows 63. The loop 2 defines in this case the predefined path P. As the rope connector 23 slides along the loop 2, the rope connector 23 is never closer than a minimum distance D to the rotors 14 or the drone 1. In FIG. 10 the rope connector is in a position on the predefined path P between the first position 51 and the second position 59.

The two ends of the loop 2 may be coupled to the drone 1 such that the drone's 1 centre of gravity 15 is exactly in between the two ends. The loop 2 may be rotatably coupled to the drone 1, and the rotational axis 4 of the loop 2 may pass through the drone's 1 centre of gravity 15. The rotation of the loop is illustrated by the arrow 61.

In an embodiment of the drone 1 shown in FIG. 15, the rope connector 23 may be fixed to the loop 2 such that it cannot slide. This represents an easy mechanical configuration of the drone and the loop. The rope 3 may also be directly tied to the loop 2. In another embodiment of the drone 1 the rope connector 23 may slide freely along the loop 2. The rope 3 may be connected to the rope connector 23 at one end of the rope 3, so that a single rope 3 is pulled by the drone 1. The rope 3 may be connected to the rope connector 23 such that the drone 1 is pulling a rope 3 folded in two (FIG. 11 and FIG. 12). In an alternative embodiment as shown in FIGS. 8 and 9, the loop is provided with a sheave 27, which is a part of a pulley 24. The pulley 24 may be fixed to the loop 2 or slidable along the loop 2. The rope 3 may run through the pulley 24. In FIGS. 8 and 9, the pulley can rotate about its own axis which is relative to the loop. In an alternative embodiment (not shown), the rope connector 23 comprises a sheave directly mounted on the loop such that the sheave can rotate about the loop itself.

In an embodiment of the drone 1 the loop 2 is designed with a curved part 25 which is circular arched and has a distance R to the centre of gravity 15 (See for example FIG. 1). At this curved part 25 the loop 2 has an equal distance to the drone's 1 centre of gravity 15. The rope connector 23 and the load may thereby slide along the loop's 2 curved part 25 without the direction of force shifting from the drone's centre of gravity 15.

In an embodiment of the drone 1 (not shown) the loop 2 is releasably attached to the drone 1 or to the arm 29. The arm 29 may be releasably attached to the drone 1.

The invention is further defined by the following items:

Item 1. A fastening device for drone, wherein the drone is arranged to be able to transfer a rope-like element about an object, characterised in that the drone is provided with an attachment, which is rotatable relative to the drone, for the rope-like element, and wherein the rotatable attachment is located outside the drone's body and lifting devices (referred to as rotor in this application) in all positions except in its rotational couplings.

Item 2. The device according to item 1, wherein the rotatable attachment has an axis of rotation which passes through the drone's centre of gravity.

Item 3. The device according to item 1 or item 2, wherein the attachment consists of a loop.

Item 4. The device according to item 3, wherein the loop has equal distance to the drone's centre of gravity, on at least part of its dimension.

Item 5. The device according to one or more of the previous items, wherein the attachment is provided with a pulley.

Item 6. The device according to one or more of the previous items, wherein the pulley is slidable along the loop.

Item 7. A method for a fastening device for a drone wherein the drone is arranged to be able to transfer a rope-like element about an object, characterised in that the method comprises:
  to provide the drone with an attachment, which is rotatable relative to the drone, for the rope-like element, and wherein the rotatable attachment is located outside the drone's body and lifting devices in all positions except in its rotation couplings; and
  to directly or indirectly connect the rope-like element to the attachment.

Item 8. The method according to item 7, wherein the method further comprises:
  to move the drone past the object while the rope-like element is connected to the attachment;
  to alter the drone's direction of movement and thereby rotate the attachment relative to the drone; and
  to alter the drone's direction of movement further so that the rope-like element at least partially surrounds the object.

Item 9. The method according to item 7 and 8 wherein the method further comprises to pull the rope-like element about the object.

Item 10. The method according to one or more of the items 7 to 9, wherein the method further comprises to let the rope-like element run through a pulley that is connected to the attachment.

By "outside" is meant here that the loop does not collide with the drone's body or lifting devices. Rotational couplings denote a connection typically in the form of a bearing wherein the attachment is rotatably engaged with the drone.

The rotatable loop is thereby free to rotate about its axis of rotation without conflicting with the drone's other parts. This allows the drone to pull a load in any direction, also downwards.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A drone having at least one thrust device, the drone comprising:
    a loop coupled to the drone, the loop comprising a rope connector configured to releasably fasten a rope to the drone in operational use of the drone, wherein the loop is configured to guide the rope connector from a first position under a bottom side of the drone along a predefined path to a second position over a top side of the drone by:
    i) rotation of the loop around a body of the drone via at least one rotational coupling between the loop and the body of the drone, or
    ii) translation of the rope connector along the loop, or
    iii) a combination of said rotation of the loop and said translation of the rope connector, wherein the first position under the bottom side and the second position over the top side of the drone are defined in operational use of the drone and wherein the predefined path is defined relative to the drone and configured to ensure a minimum distance between the rope connector and the at least one thrust device of the drone, and
    wherein a first end of the loop is coupled to a first side of the drone and a second end of the loop is coupled to a second side of the drone, the second side being opposite the first side.

2. The drone according to claim 1, wherein the center of gravity of the drone is between the first and second ends.

3. The drone according to claim 2, wherein at least a portion of the loop has a constant radius R with respect to the center of gravity of the drone.

4. The drone according to claim 3, wherein the first side is the top side of the drone, and the second side is the bottom side of the drone, the top side and bottom side being defined in normal operational use of the drone, and wherein the rope connector is slidable along the loop from the first end to the second end and back.

5. The drone according to claim 2, wherein the first side is the top side of the drone, and the second side is the bottom side of the drone, the top side and bottom side being defined in operational use of the drone, and wherein the rope connector is slidable along the loop from the first end to the second end and back.

6. The drone according to claim 1, wherein the first side is the top side of the drone, and the second side is the bottom side of the drone, the top side and bottom side being defined in operational use of the drone, and wherein the rope connector is slidable along the loop from the first end to the second end and back.

7. The drone according to claim 6, wherein the loop is configured to guide the rope connector from the first position along the predefined path to the second position by (ii) translation of the rope connector along the loop, and wherein the first end and the second end of the loop are fixed to the drone, not allowing rotation of the loop.

8. The drone according to claim 6, wherein the first end and the second end of the loop are rotatably coupled to the drone allowing the loop to freely rotate around the drone.

9. The drone according to claim 1, wherein the first side is a left side of the drone, and the second side is a right side of the drone, the left side and the right side being defined in operational use of the drone, and wherein the first end and the second end of the loop are rotatably coupled to the drone.

10. The drone according to claim 9, wherein the loop is rotatable around the drone about an axis of rotation, wherein the axis of rotation runs through the center point of gravity of the drone.

11. The drone according to claim 9, wherein the loop is configured to guide the rope connector from the first position along the predefined path to the second position over by (i) rotation of the loop around the body of the drone via the at least one rotational coupling, and wherein the rope connector is fixed to the loop at a position between the first end of the loop and the second end of the loop such that the rope connector cannot slide with respect to the loop.

12. The drone according to claim 9, wherein the rope connector is slidable along the loop from the first end to the second end and back.

13. The drone according to claim 1, further comprising an arm coupled to the drone, wherein the loop is rotatably connected to the arm such that the loop can freely rotate around the drone.

14. The drone according to claim 13, wherein the arm is rotatably or pivotably coupled to the drone.

15. The drone according to claim 1, wherein the rope connector comprises a sheave for the rope to route through.

16. The drone according to claim 1, wherein the loop is releasably coupled to the drone.

17. A method for suspending a rope from an object, the method comprising the steps of:
    providing a drone according to claim 1;
    attaching a section of the rope to the rope connector;
    flying the drone upwards from ground level to a height above the object such that the rope connector is located above the object;
    subsequently flying the drone to move the drone past the object, pulling the section of the rope over the object;
    subsequently flying the drone downwards, on an opposite side of the object from where the drone flew up, pulling the section of the rope towards ground level; and
    releasing the rope from the rope connector, such that the rope is suspended from the object.

18. The method according to claim 17, further comprising:
    providing the loop with a sheave; and
    routing letting the rope through the sheave.

19. The method according to claim 17, wherein the object is a power line.

* * * * *